3,130,163
REFRIGERATION METHOD
Fitzhugh Lee Avera, Alameda, Calif., assignor to Royal Super Ice Company, a corporation of California
No Drawing. Filed Jan. 17, 1962, Ser. No. 166,915
2 Claims. (Cl. 252—67)

The invention relates to a new use of a novel refrigerant gel and to its method of manufacture. This application is a continuation in part of application, Serial No. 663,593, filed June 5, 1957, for Refrigerant Gel.

An object of the present invention is to provide a new and improved refrigeration process which involves the use of a specially selected refrigerant gel which will provide when frozen and permitted to thaw in heat transfer relation with products to be refrigerated, improved and longer lasting refrigeration protection of such products.

Another object of the present invention is to provide a refrigerant gel, of the character described, which will have a maximum water content with correspondingly high latent heat on change of state, and which is completely stable throughout a wide range of temperature and may be repeatedly frozen and thawed without the release of water, thus affording with the use of the gel of the present invention, neat, dry and otherwise desirable refrigerant packaging.

It has been a goal in the art of water-bearing refrigerant compositions to have as much as possible of the total refrigerant consist of pure water. There are several reasons for this. One is to obtain the desirable latent heat quality of water when changing from frozen to thawed states. A second reason lies in the fact that this latent heat is greatest when the water is free or substantially free from dissolved substances and exhibits its normal freezing point of 32° F.

Efforts in the prior art to immobilize the liquid water for convenience and the efficiency of control during and after use as a refrigerant sacrificed valuable latent heat by both reducing significantly the total percentage of water in the composition and often by forming eutectic mixtures with significantly different freezing points than pure water. The product of the present invention includes a very high percentage, in the order of ninety-eight percent, of substantially dissolved solids-free water in a state of immobility wherein the solids which are present entrain the water so that it does not exist as free water but as a vital component of a stable plastic mass or gel.

Another object of the present invention is to provide a refrigerant gel of the character described which may be manufactured and which may be readily kept and maintained throughout a long and useful life in a clean, sterile condition.

A further object of the present invention is to provide a gel of the character above which may be produced from relatively low-cost, abundantly available materials and by simple methods involving the use of minimum equipment and labor.

The invention possesses other objects and features of advantage, some of which, with the foregoing, will be set forth in the following description of the preferred form of the invention. It is to be understood, however, that variations in the showing made by the description may be adopted within the scope of the invention as set forth in the claims.

The present invention consists briefly in the use of a refrigerant gel composed of water and the reaction product of anhydroglucosesodiumglycolate and a water-soluble metal salt derived from a variable valence polyvalent metal below sodium in the electromotive force series of elements.

As hereinabove noted, this gel may be composed with a relatively very high water content so that approximately ninety-eight percent of the composition is composed of water and only two percent solids, and of equal importance the solids in this case are, it is believed, precipitated out of solution in linked structure entraining and adsorbing the water so that the latter is left substantially dissolved solids-free but is held as the principal component of an in situ formed plastic mass. In accordance with the present invention, the anhydrogluocosesodiumglycolate and the water-soluble metal salt are combined in stoichiometric proportions so that there is present only the pure water and the precipitated reaction product which forms the matrix to entrain the water in a plastic gel mass.

The anhydroglucosesodiumglycolate may be of polyanhydroglucosesodiumglycolate form and may be prepared as follows:

*Material "A"*

Examples:
Polyanhydroglucosesodiumglycolate
Anhydroglucosesodiumglycolate

Preparation of polyanhydroglucosesodiumglycolate:
(1) React hydroxyacetic acid, also known as glycolic acid, with aqueous sodium hydroxide, giving sodium hydroxyacetate, also known as sodium glycolate, plus water.

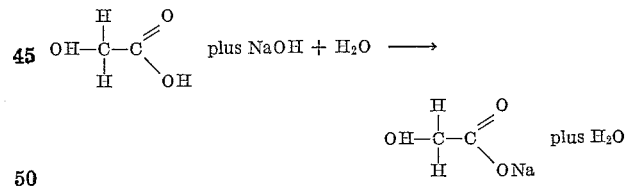

(2) React sodium hydroxyacetate, also known as sodium glycolate, with a poly anhydro glucose compound, giving polyanhydroglucosesodiumglycolate plus water.
Example of polyanhydroglucose compounds:

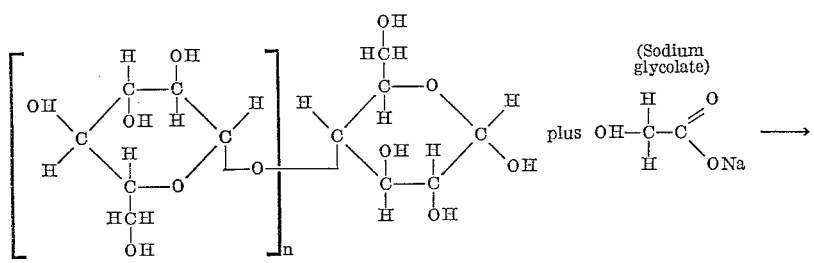

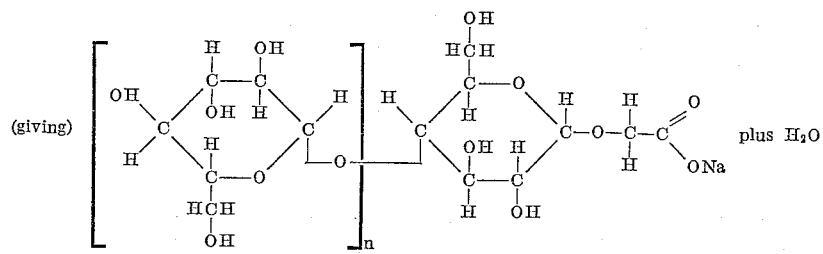

where: $n$ equals 1, compound is cellobios; $n$ equals 2, compound is cellotrios; $n$ equals 3, compound is cellotetrose; $n$ equals $3+X$ compound is cellulose.

The preparation of anhydroglucosesodiumglycolate may be as follows:

React anhydroglucose with sodiumhydroxyacetate, also known as sodium glycolate, giving anhydroglucosesodiumglycolate plus water.

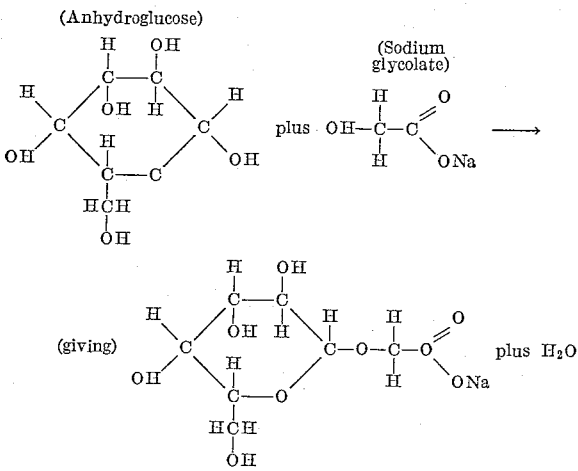

A water-soluble metal salt is now selected for purposes of reaction as the metal salt will release its radical in aqueous solution as a single atom with variable valence and polyvalence and with the metal capable of chemical reaction while in solution. The general mechanism of the reaction which produces my new refrigerant gel as an in situ reaction is thought to be as follows:

The aqueous solution of anhydroglucosesodiumglycolate releases a sodium ion which interacts with a metal salt chosen to contain a metal ion which is lower in the electromotive force series of elements than sodium and enters ionic equilibrium therewith. The reaction product of the radical from the metal salt and the organic radical from the anhydroglucosesodiumglycolate creates an insoluble compound which precipitates from solution and drives the ionic equilbrium towards organic sodium ion deficiency and as the ionic equilibrium is again attained, more sodium is reacted and more organic radical is rendered insoluble. This reaction continues until the organic material radical of the anhydroglucosesodiumglycolate is entirely precipitated from solution and the product of my invention, the refrigerant composition, then achieved. Only sufficient metal salt is included to complete the reaction so that the final product consists in the main of two major products, viz., pure water and the reaction product precipitate which holds the water immobile in the gel.

Accordingly, the general class of metal salts which may be used are water-soluble and are derived from a variable valence polyvalent metal below sodium in the electromotive force series of elements. As specific examples, I may use (1)     Normal bismuth sulfate
(2)     Ferrous sulfate
(3)     Aluminum sulfate
(4)     Manganese sulfate
(5)     Aluminum chloride ($AlCl_3$)

An example and preferred mode of compounding is as follows:

Prepare a first solution compounded by dissolving approximately two parts polyanhydroglucosesodiumglycolate in approximately 90.35 parts of water by the slow addition of the former to the latter while subjecting the liquid to strong shearing agitation at room temperature or at slightly warmer temperatures, the aforementioned parts being taken as percentage of total weight of the final product.

Prepare a second solution compounded by dissolving in approximately 7.5 parts of water approximately 0.15 part of the water-soluble metal salt aluminum sulfate above described, and preferably and for the purpose of this example, the parts again being taken as percentage of total weight of the end product.

Slowly add the second solution to the first solution while subjecting the mixture to strong shearing agitation at room temperature or at slightly warmer temperatures and continuing this agitation until the mixture undergoes metathesis resulting in the precipitation of the dissolved substances and the composition assumes a gel-like form with the liquid water immobilized. The length of final agitation is not critical inasmuch as excess agitation is not harmful and insuffiicent agitation is avoided by the need for continuous agitation until the second solution has been completely added to the first solution. It may be observed that the final composition is formed in situ whereupon the solids are substantially cast out of solution through the action of the postulated metathesis.

The foregoing refrigerant product is thus composed of approximately 98% water and approximately 2% the reaction product of polyhydroglucosesodiumglycolate and aluminum sulfate; that is the combination of polyanhydroglucosesodiumglycolate and aluminum sulfate in stoichiometric proportions. Where other metal salts above are used they are to be included in a molar equivalent weight of 0.15 part of aluminum sulfate.

As a general safeguard against deterioration of the refrigerant gel composition under the various exposures of industrial use and as a deterrent to the growth of bacteria, mold or fungi, a small amount of a fungicide, fungistat or germicide, chosen from commercial agents available may be used. Three such agents are here given by way of example:

(1) Roccal, a sanitizing agent including alkyi dimethyl benzyl ammonium chlorides (benzalkonium chloride) manufactured by Sterwin Chemicals, New York, New York.
(2) Klor-24, a chlorine base sanitizing and anti-bacterial agent manufactured by Vern Jones Technical Research, Encino, California.
(3) Iodine dissolved in a minimal amount of acetone.

The use of the refrigerant gel of the present invention has produced spectacularly new and unexpected beneficial results in the shipping of refrigerated produce such as poultry, meat, fish and other perishables such as flowers and the like as a replacement for water ice. One example of such use is in the truck shipping of fresh chickens over long distances as an example from the Deep South to San Francisco, a trip involving three to four days. The conventional method is to pack the chickens, which have been precooled for shipment to about 38° F. in wooden cases with shredded ice or ice cubes. Usually about 60 pounds of chickens are placed in each case with about 30 pounds of ice. Approximately 400 such cases may be loaded into a standard mechanically refrigerated truck with a layer of bottom ice and a layer of top ice, considering a truck having a maximum allowed weight of 40,000 pounds.

By contrast, using the process of the present invention the refrigerant gel is first preferably packaged in plastic bags for convenient handling and freezing. Three-pound bags have been found a good size for this purpose. Because there is no water run-off during thawing of the refrigerant gel, the goods may be shipped in cardboard containers if desired, thus saving substantially in weight, cost and shipping space. It has been found under carefully conducted tests supervised by U.S.D.A. inspectors that in using the process of the present invention two three-pound bags of applicant's refrigerant gel will do the same work as thirty pounds of water ice, and do it better. In these test shipments each case contained about 60 pounds of chickens with six pounds of frozen refrigerant gel, the chickens again being precooled for shipment to about 38° F.; and the refrigerant gel frozen to about 0° F. 571 cases of chickens packed with the refrigerant gel of the present invention may be placed in the same truck as noted above in the place of the 400 cases packaged with conventional water ice. Furthermore, it has been found that the refrigerant of the present invention is so effective that the bottom ice layer in the truck could be deleted, using top ice alone. Chickens arrived at destination in the test shipments at a most satisfactory temperature of about 34° F. and of equal importance with their full fresh appearance in contrast to the washed out appearance of chickens shipped in water ice.

Another example is a test cooling of fresh fish conducted by the University of California Medical Center in San Francisco. Forty pounds of small, round sablefish were packed in each of two boxes. In one box there was added ten pounds of water ice on the bottom and eleven pounds of water ice on top making a total of twenty-one pounds of water ice used for forty pounds of fish. In the second box there was added two packages (six pounds) of frozen refrigerant gel of the present invention on the bottom and two packages (six pounds) of the gel on top. Thermo-couples were placed in the center of a fish on top, in the middle, and on the bottom of each box. Both boxes were stored at an air temperature of 55° F. In both cases the average temperature of the fish decreased from a starting temperature of about 50° to about 35° during the first eight hours. However, later average temperatures were greatly in favor of the present refrigerant as follows:

|  | Fish Temperature Packed by— | |
|---|---|---|
|  | Water Ice, °F. | Present Refrigerant Gel, °F. |
| After 22 hours | 41.2 | 36.2 |
| After 23 hours | 42 | 36.5 |
| After 24 hours | 42.5 | 36.7 |
| After 25 hours | 43.5 | 37 |
| After 26 hours | 44 | 37 |
| After 27 hours | 45 | 37.5 |
| After 28 hours | 46 | 37.7 |
| After 29 hours | 47 | 38 |
| After 30 hours | 48 | 38.7 |

I claim:
1. The method of refrigeration which consists in the selection and use of a refrigerant gel composed of approximately 98 percent water and approximately 2 percent the reaction product of anhydroglucosesodiumglycolate and water-soluble metal salt taken from the class consisting of normal bismuth sulfate, ferrous sulfate, aluminum sulfate, manganese sulfate and aluminum chloride, said reaction product forming a linked structure entraining said water in a stable gel, and said anhydroglucosesodiumglycolate and salt being reacted in substantially stoichiometric proportions thereby leaving said water in substantially dissolved solids-free state; freezing said gel; placing the frozen gel in heat transfer relation to be cooled; and permitting said frozen gel to thaw while in said relation.

2. The method of refrigeration which consists in the selection and use of a refrigerant gel composed of approximately 98 percent water, and approximately 2 percent the reaction product of anhydroglucosesodiumglycolate and aluminum sulfate reacted in substantially stoichiometric proportions thereby leaving said water in substantially dissolved solids-free state; said reaction product forming a linked structure entraining said water in a stable gel; freezing said gel; placing the frozen gel in heat transfer relation to material to be cooled; and permitting said frozen gel to thaw while in said relation.

References Cited in the file of this patent

UNITED STATES PATENTS

| 2,331,859 | Roberts | Oct. 12, 1943 |
| 2,477,544 | Moe | July 26, 1949 |
| 2,599,771 | Moe | June 10, 1952 |
| 2,725,301 | Mayer et al. | Nov. 29, 1955 |
| 2,733,156 | Cornell et al. | Dec. 10, 1956 |

FOREIGN PATENTS

| 204,756 | Australia | Dec. 10, 1956 |